United States Patent
Rogers et al.

(10) Patent No.: US 12,172,393 B2
(45) Date of Patent: Dec. 24, 2024

(54) PROCESS FOR COMPRESSION MOLDING A COMPOSITE ARTICLE

(71) Applicant: CYTEC INDUSTRIES INC., Princeton, NJ (US)

(72) Inventors: Scott Rogers, Placentia, CA (US); Alejandro Jose Rodriguez Chacon, Rancho Santa Margarita, CA (US); Aurele Bras, St-Brieuc (FR); Adam Whysall, Ripley (GB)

(73) Assignee: CYTEC INDUSTRIES INC., Princeton, NJ (US)

( * ) Notice: Subject to any disclaimer, the term of this patent is extended or adjusted under 35 U.S.C. 154(b) by 267 days.

(21) Appl. No.: 17/612,534

(22) PCT Filed: May 14, 2020

(86) PCT No.: PCT/US2020/032929
§ 371 (c)(1),
(2) Date: Nov. 18, 2021

(87) PCT Pub. No.: WO2020/236522
PCT Pub. Date: Nov. 26, 2020

(65) Prior Publication Data
US 2022/0297396 A1    Sep. 22, 2022

Related U.S. Application Data

(60) Provisional application No. 62/850,288, filed on May 20, 2019.

(51) Int. Cl.
| | | |
|---|---|---|
| B29C 70/46 | (2006.01) | |
| B29C 70/34 | (2006.01) | |
| B29K 77/00 | (2006.01) | |
| B29K 81/00 | (2006.01) | |
| B29K 101/10 | (2006.01) | |
| B29K 105/08 | (2006.01) | |
| B29K 307/04 | (2006.01) | |
| B29K 309/08 | (2006.01) | |

(52) U.S. Cl.
CPC .......... B29C 70/465 (2013.01); B29C 70/345 (2013.01); *B29K 2077/00* (2013.01); *B29K 2081/06* (2013.01); *B29K 2101/10* (2013.01); *B29K 2105/0872* (2013.01); *B29K 2307/04* (2013.01); *B29K 2309/08* (2013.01); *B29K 2995/0097* (2013.01)

(58) Field of Classification Search
CPC .... B29C 70/465; B29C 70/345; B29C 70/026
See application file for complete search history.

(56) References Cited

U.S. PATENT DOCUMENTS

| | | | | |
|---|---|---|---|---|
| 3,210,230 A * | 10/1965 | Tyhurst | ............... | B29C 37/0032 156/278 |
| 3,969,177 A * | 7/1976 | Doran | ................... | B29C 70/345 156/289 |
| 5,085,928 A * | 2/1992 | Krueger | .................. | B32B 9/007 428/113 |
| 5,134,026 A * | 7/1992 | Melcher | .................. | C08L 97/02 428/326 |
| 5,614,305 A * | 3/1997 | Paine | .................... | F41H 5/0457 428/113 |
| 7,942,993 B2 * | 5/2011 | Gessler | ................. | B29C 70/202 156/247 |
| 8,317,958 B2 * | 11/2012 | Joern | ...................... | B29B 11/16 156/247 |
| 11,760,053 B2 * | 9/2023 | Yamane | .................... | B32B 5/26 428/413 |
| 2003/0175520 A1 * | 9/2003 | Grutta | ..................... | B29C 70/46 264/237 |
| 2011/0059308 A1 * | 3/2011 | Partington | ................. | C08J 5/10 428/297.4 |
| 2013/0142988 A1 * | 6/2013 | Grelin | ................... | B29C 70/086 264/258 |
| 2019/0001586 A1 * | 1/2019 | Naito | ..................... | B29C 70/14 |
| 2020/0166998 A1 | 5/2020 | Li | | |

FOREIGN PATENT DOCUMENTS

| | | |
|---|---|---|
| EP | 0330960 A2 | 9/1989 |
| EP | 3321055 A1 | 5/2018 |

OTHER PUBLICATIONS

Hojo, M., T. Ando, M. Tanaka, T. Adachi, S. Ochiai, Y. Endo, Modes I and II interlaminar fracture toughness and fatigue delamination of CF/epoxy laminates with self-same epoxy interleaf, International Journal of Fatigue, vol. 28 (2006), pp. 1154-1165. (Year: 2006).*

* cited by examiner

*Primary Examiner* — Matthew J Daniels
(74) *Attorney, Agent, or Firm* — Thi Dang

(57) ABSTRACT

The present invention generally relates to processes for compression molding a composite article comprising at least one prepreg and at least one transformer film.

8 Claims, No Drawings

PROCESS FOR COMPRESSION MOLDING A COMPOSITE ARTICLE

CROSS-REFERENCE TO RELATED APPLICATIONS

The instant application is a U.S. national phase entry under 35 U.S.C. § 371 of International Application No. PCT/US2020/032929 filed on May 14, 2020, which claims the benefit of prior U.S. Provisional Application No. 62/850,288 filed on May 20, 2019, the content of each of these prior filed applications is incorporated herein by reference in its entirety.

TECHNICAL FIELD

The present invention generally relates to a process for compression molding a composite article. More specifically, the present invention relates to a process for compression molding a composite article comprising at least one prepreg and at least one transformer film. The present invention also relates to composite articles made by the compression molding process.

BACKGROUND

Basic compression molding processes allow for the quick production of a variety of articles for various industries. In the most basic compression molding processes, raw materials, such as thermoplastics, thermosets, natural rubbers, and elastomers, can be placed into a mold, and under heat and pressure, the raw materials can be formed into a desired article.

Articles made by compression molding processes can have various forms and structures, including everything from very basic shapes and surfaces to relatively complex shapes and surfaces. For instance, compression molding processes can be used to make simple articles having a basic shape, uniform thickness, and a flat surface, or such processes can be used to make more ornate and complex articles having complicated shapes, varying thicknesses in the article, and decorative and/or functional surface designs.

Prepregs are typically used when making composite articles, especially for certain fields such as aerospace, automotive, and industrial applications. Generally, prepregs have reinforcing fibers impregnated with a given matrix resin, such as thermoset polymers or thermoplastic polymers. The reinforcing fibers in a prepreg can generally have a variety of forms, and can be oriented in various ways to form different structures, including weaves, fabrics, veils, and other structures. In order to form a prepreg layup, multiple prepregs can be layered, such that when the prepregs are heated and then finished into the final composite article, the composite article has internal layers formed from the reinforcing fibers and matrix resin.

Traditionally, composite articles are made by an autoclave process, in which prepregs having a thermoset matrix resin are layered onto a flat substrate or into a mold cavity, and then the layered prepregs are laminated together by relatively high heat and high pressure during a curing step. Yet, while autoclave processes can be used to make highly complex composite articles, autoclave processes are expensive and require significant space for operating the autoclave. Additionally, autoclave processes require relatively high heat and high pressure to form the composite articles.

Another method for making composite articles is known as the Vacuum Assisted Resin Transfer Molding ("VARTM") process, in which the reinforcing fiber—usually in the form of a weave or fabric but without the matrix resin—is placed in a one-sided mold and vacuum bagged. A liquid matrix resin is introduced through one or more ports in the one-sided mold and then drawn across the reinforcing fiber by vacuum. Unlike autoclave processes, a benefit of using VARTM processes is that such processes do not require high heat or high pressure—rather, the liquid resin is usually drawn across the reinforcing fiber at a lower pressure than autoclave processes—and curing usually occurs at a lower temperature. Additionally, since VARTM processes do not require an autoclave, the expense and space required to operate an autoclave can be eliminated. Yet, there are still drawbacks with using VARTM processes, including having to use a liquid matrix resin as opposed to having the ability to use a solid matrix resin. Further, while the liquid matrix resin in VARTM processes can be drawn across the reinforcing fiber at a relatively low pressure, controlling the flow of the resin to ensure the reinforcing fiber is fully coated (i.e., sufficient fiber wetout) can be difficult. Lastly, if the liquid resin is unevenly drawn across the reinforcing fiber, a significant amount of the liquid resin can be discarded in the resin trap before the reinforcing fiber is fully coated.

Moreover, while certain prepregs can be used in a Vacuum Bag Only ("VBO") process, the time required to set up the VBO process can be significant and inefficient, especially when making high quantities of composite articles. This is because each individual composite article made by the VBO process needs to be individually bagged and formed under pressure.

As for basic compression molding processes, while such processes can generally be used to quickly make a variety of articles, when making composite articles, basic compression molding processes can have drawbacks. Specifically, in compression molding, resin bleed can impact the overall performance of the composite article, as well as the compositional distribution of the matrix resin and reinforcing fiber. For instance, when a prepreg or prepreg layup (i.e., layered prepregs) is compression molded, the amount of the matrix resin in the resulting composite article may be reduced during the process. This reduction in the matrix resin can impact the shape and design of the article, as well as the compositional distribution of the matrix resin and reinforcing fibers, which in turn can impact the overall performance of the composite article.

Further, in certain fields, such as aerospace, automotive, and industrial applications, composite articles must meet certain specification standards, including compositional distribution requirements. If the compositional distribution requirements of the matrix resin and reinforcing fiber within the composite article (e.g., the overall wt. % of the matrix resin and overall fiber volume % of the reinforcing fiber in the composite article) are not within the specification standards, then the composite article will be considered to be outside of the required specification standards—or "out of spec." And if the composite article is considered to be out of spec, then it cannot be used.

Given the challenges above, there remains a need in the art for inexpensive processes to quickly make composite articles. In particular, there remains a need in the art for processes for compression molding a composite article. There also remains a need in the art for composite articles made by compression molding processes.

SUMMARY OF INVENTION

The present invention generally relates to processes for compression molding a composite article comprising at least one prepreg and at least one transformer film. In this regard, an embodiment of the present invention relates to a process for compression molding a composite article, the process comprising molding a composite layup in a compression mold cavity to form the composite article, wherein the composite layup comprises at least one prepreg and at least one transformer film, and the prepreg comprises a matrix resin and reinforcing fibers, and the transformer film comprises the matrix resin.

Another embodiment of the present invention relates to a process for compression molding a composite article, the process comprising: combining at least one prepreg and at least one transformer film to form a composite layup, wherein the prepreg comprises a matrix resin and reinforcing fibers, and the transformer film comprises the matrix resin; placing the composite layup in a compression mold cavity; and molding the composite layup to form the composite article.

In an additional embodiment, the present invention relates to a composite article made by a compression molding process, the process comprising molding a composite layup in a compression mold cavity to form the composite article, wherein the composite layup comprises at least one prepreg and at least one transformer film, and the prepreg comprises a matrix resin and reinforcing fibers, and the transformer film comprises the matrix resin.

In yet another embodiment, the present invention relates to a composite article made by a compression molding process, wherein the process comprises: combining at least one prepreg and at least one transformer film to form a composite layup, wherein the prepreg comprises a matrix resin and reinforcing fibers, and the transformer film comprises the matrix resin; placing the composite layup in a compression mold cavity; and molding the composite layup to form the composite article.

DETAILED DESCRIPTION

General Definitions

The term and phrases "invention," "present invention," "instant invention," and similar terms and phrases as used herein are non-limiting and are not intended to limit the present subject matter to any single embodiment, but rather encompasses all possible embodiments as described.

Throughout the description, including the claims, the term "a" and the phrase "at least one" are synonymous, and likewise, the phrase "comprising one" or "comprising a" should be understood as being synonymous with the term "comprising at least one," unless otherwise specified. Additionally, "between" should be understood as being inclusive of the limits. Further, throughout the description, including the claims, the terms "comprising" and "having" can be used interchangeably, and should be understood as being synonymous.

It should be noted that in specifying any range of concentration, weight ratio or amount, any particular upper concentration, weight ratio or amount can be associated with any particular lower concentration, weight ratio or amount, respectively.

Compression Molding

The present invention generally relates to processes for compression molding a composite article. More specifically, the present invention relates to a process for compression molding a composite article comprising at least one prepreg and at least one transformer film.

The compression molding process useful for the invention is not limited to any specific compression molding process, and can include any compression molding process. Generally, the compression molding process includes a compression mold cavity, and in certain embodiments, the compression molding process can include at least two mold parts. Further, in certain embodiments the compression mold cavity can be formed in at least one of the mold parts, for instance in a female or cavity mold part of one of the mold parts, or the compression mold cavity can be formed between at least two mold parts. Additionally, the mold parts can be oriented in any fashion, including having a male mold part or a female or cavity mold part attached to an upper platen in the compression molding process. Alternatively, the mold parts can be horizontally oriented, or the mold parts can be oriented at an angle.

Prepreg

Various types of prepregs can be used in the instant invention. As used herein, the term "prepreg" refers to a layer of reinforcing fibers that has been impregnated or infused with a matrix resin. The term "impregnate," "infuse," and similar terms as used in this disclosure with respect to a prepreg refers to contacting the reinforcing fibers with the matrix resin such that the reinforcing fibers are partially or fully coated or encapsulated with the matrix resin.

In general, the prepreg can have 25 wt. % to 50 wt. %, preferably 30 wt. % to 40 wt. %, and most preferably 32 wt. % to 38 wt. % of the matrix resin, based on the total wt. % of the prepreg. Additionally, in general, the prepreg can have 50 wt. % to 75 wt. %, preferably 60 wt. % to 70 wt. %, and most preferably 62 wt. % to 68 wt. % of the reinforcing fibers, based on the total wt. % of the prepreg.

Reinforcing fibers in the prepregs that are useful for the instant invention can be in various shapes and forms, and can be oriented in various ways. For example, the reinforcing fibers can be chopped fibers, continuous fibers, filaments, tows, bundles, and combinations thereof. Additionally, the reinforcing fibers can be unidirectional oriented (i.e., aligned in one direction) or multi-directional oriented (i.e., aligned in different directions), and the reinforcing fibers can form various structures, including but not limited to a sheet, ply, weave, fabric, non-woven, woven, knitted, stitched, wound, and braided structure, as well as swirl mat, veil, felt mat, and chopped mat structures. Woven structures having the reinforcing fibers may comprise a plurality of woven tows, in which each tow is composed of a plurality of filaments, including but not limited to thousands of filaments. In certain embodiments, the reinforcing fibers in the prepregs can form a structure such that the reinforcing fiber density is 100 gsm to 1000 gsm, preferably 200 gsm to 500 gsm, and even more preferably 250 gsm to 450 gsm. In further embodiments, the tows may be held in position by cross-tow stitches, weft-insertion knitting stitches, or a small amount of resin binder, such as a thermoplastic or thermoset resin.

Reinforcing fibers in the prepregs useful for the instant invention can be made from a variety of materials to form the corresponding fibers including, but not limited to, glass (to form glass fibers), carbon, graphite, aramid, polyamide, high-modulus polyethylene (PE), polyester, poly-p-phenylene-benzoxazole (PBO), boron, quartz, basalt, ceramic, organic synthetic materials, such as Kevlar®, ceramic, metals, including copper, thermoplastic polymer resin(s), and combinations thereof. In certain preferred embodiments, the reinforcing fibers are glass fibers, carbon fibers, thermoplastic polymer fibers, glass fiber fabric, carbon fiber fabric, thermoplastic polymer fabric, glass veils, carbon fiber veils, thermoplastic polymer veils, and combinations thereof. Further, the glass fibers can be any glass fibers, including but not limited to glass fibers selected from Electrical or E-glass fibers, A-glass fibers, C-glass fibers, E-CR-glass fibers, D-glass fibers, R-glass fibers, S-glass fibers, or combinations thereof. The carbon fibers can also be any carbon fibers, including but not limited to carbon fibers formed from a polyacrylonitrile (PAN) polymer, pitched-based carbon fibers, and combinations thereof.

In certain preferred embodiments, such as for making high-strength composite materials, the reinforcing fibers can preferably have a tensile strength of greater than 3500 MPa (per ASTM D4018 test method).

Matrix Resin

As discussed above, prepregs useful for the instant invention have a matrix resin, which is in addition to the reinforcing fibers. Transformer films useful for the instant invention, as discussed below, also have a matrix resin. In certain preferred embodiments, the matrix resin in the prepreg is the same matrix resin in the transformer film. In this respect, it is important to distinguish between the matrix resin, which is the polymeric resin portion in the prepreg and the transformer film, versus other compounds and/or components that can be added to the matrix resin. As used herein, the term "matrix resin" means the polymeric resin portion that forms the matrix resin in both the prepreg and the transformer film. And while other compounds and/or components can be added to the matrix resin, including but not limited to any additives, reinforcing agents, fillers, or any other compound and/or component, the matrix resin is the polymeric resin. Accordingly, the matrix resin in both the prepreg and the transformer film can be the same polymer resin, and in particularly preferred embodiments the matrix resin is the same polymer resin in both the prepreg and the transformer film.

The matrix resins useful for the instant invention can be selected from a variety of polymeric resins. For instance, the matrix resin can be a thermoplastic resin, a thermoset resin, or combinations thereof. Additionally, the matrix resin can have more than one thermoplastic resin, more than one thermoset resin, or combinations of more than one thermoplastic and thermoset resins.

In certain embodiments, the matrix resin can be a thermoplastic resin selected from polyamides, polyphthalamides, poly(aryl ether sulfone)s, including but not limited to polysulfone, polyethersulfone, polyetherethersulfone, polyethersulfone/polyetherethersulfone copolymers, and polyphenylsulfone, poly(aryl ether ketone)s, including but not limited to polyether ketone, polyether ether ketone, poly ether ketone ketone, polyetherimides, polyimides, polyamide imides, polyphenylene sulfides, polycarbonates, fluoropolymers, including but not limited to polyvinylidene fluoride, and combinations thereof. In certain preferred embodiments, the thermoplastic matrix resin can be a thermoplastic resin selected from polyamides, poly(aryl ether sulfone)s, including but not limited to polysulfone, polyethersulfone, polyethersulfone/polyetherethersulfone copolymers, and polyphenylsulfone, poly(aryl ether ketone) copolymers, and polyphenylsulfone, poly(aryl ether ketone)s, including but not limited to polyether ketone, polyether ether ketone, poly ether ketone ketone, polyphenylene sulfides, and combinations thereof.

In other embodiments, the matrix resin can be a thermoset resin selected from epoxies, phenolics, phenols, cyanate esters, bismaleimides, benzoxazines, polybenzoxazines, polybenzoxazones, and combinations thereof and precursors thereof. In certain preferred embodiments, the matrix resin can be a multifunctional epoxy resins (or polyepoxides) having a plurality of epoxide functional groups per molecule. The polyepoxides can be saturated, unsaturated, cyclic, acyclic, aliphatic, aromatic, or heterocyclic. Examples of polyepoxides include, but are not limited to, polyglycidyl ethers, which are prepared by a reaction of epichlorohydrin or epibromohydrin with a polyphenol in the presence of alkali. Examples of useful polyphenols for making polyglycidyl ethers include, but are not limited to, resorcinol, pyrocatechol, hydroquinone, bisphenol A (bis(4-hydroxyphenyl)-2,2-propane), bisphenol F (bis(4-hydroxyphenyl)methane), fluorine 4,4'-dihydroxy benzophenone, bisphenol Z (4,4'-cyclohexylidenebisphenol) and 1,5-hyroxynaphthalene. Other suitable polyphenols for making polyglycidyl ethers are the known condensation products of phenol and formaldehyde or acetaldehyde of the novolac resin-type.

Non-limiting examples of suitable epoxy resins include diglycidyl ethers of bisphenol A or bisphenol F, e.g., EPON™ 828 (liquid epoxy resin), D.E.R.™ 331, D.E.R.™ 661 (epoxy resins) available from Dow Chemical Co.; and trifunctional epoxy resins, including triglycidyl ethers of aminophenol, e.g., ARALDITE® MY 0510, MY 0500, MY 0600, MY 0610 from Huntsman Corp., and combinations thereof. Additional examples include, but are not limited to, phenol-based novolac epoxy resins, commercially available as D.E.N.™ 428, D.E.N.™ 431, D.E.N.™ 438, D.E.N.™ 439, and D.E.N.™ 485 from Dow Chemical Co; cresol-based novolac epoxy resins commercially available as ECN 1235, ECN 1273, and ECN 1299 from Ciba-Geigy Corp.; and hydrocarbon novolac epoxy resins commercially available as TACTIX® 71756, TACTIX® 556, and TACTIX® 756 from Huntsman Corp., and combinations thereof.

The curing agents useful for curing the thermoset resins may be selected from known curing agents including, for example, aromatic or aliphatic amines, or guanidine derivatives. In certain preferred embodiments, the curing agent can be an aromatic amine, and preferably an aromatic amine having at least two amino groups per molecule, and particularly preferable are diaminodiphenyl sulphones, for instance where the amino groups are in the meta- or in the para-positions with respect to the sulphone group. Particular non-limiting examples are 3,3'- and 4,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis-(2,6-diethyl)-aniline (MDEA from Lonza); 4,4'methylenebis-(3-chloro, 2,6-diethyl)-aniline (MCDEA from Lonza); 4,4'methylenebis-(2,6-diisopropyl)-aniline (M-DIPA from Lonza); 3,5-diethyl toluene-2,4/2,6-diamine (D-ETDA 80 from Lonza); 4,4'methylenebis-(2-isopropyl-6-methyl)-aniline (M-MIPA from Lonza); 4-chlorophenyl-N,N-dimethyl-urea (e.g., Monuron); 3,4-dichlorophenyl-N,N-dimethyl-urea (e.g., Diuron™), dicyanodiamide (e.g., Amicure® CG 1200 from Pacific Anchor Chemical), and combinations thereof.

In other embodiments, the curing agents can be anhydrides, and in particular polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, trimellitic anhydride, and combinations thereof.

Transformer Film

As discussed above, the process of the instant invention uses a transformer film along with a prepreg to form a compression molded composite article. Similar to prepregs, transformer films useful for the instant invention have a matrix resin. And, as discussed above, in certain preferred embodiments, the matrix resin in the transformer film is the same as the matrix resin in the prepreg. However, unlike the prepreg, the transformer film has a significantly higher amount of the matrix resin. In this respect, in certain embodiments, the transformer film has the matrix resin, which can be the same as the matrix resin in the prepreg, along with a carrier material. In preferred embodiments, the transformer film comprises at least 50 wt. %, preferably at least 70 wt. %, more preferably at least 80 wt. %, and even more preferably at least 90 wt. % of the matrix resin, based on the total wt. % of the transformer film.

As noted above, in addition to the matrix resin, in certain preferred embodiments the transformer film can have a carrier material. The carrier material allows the transformer film to be handled during processing, and can be formed from a variety of components, including from the reinforcing fibers useful for the prepreg, as discussed above; however, while the carrier material can be formed from reinforcing fibers useful for the prepreg, the amount of the carrier material in the transformer film is less than the amount of reinforcing fibers in the prepreg. Therefore, even if the carrier material has reinforcing fibers, or the carrier material is selected from the reinforcing fibers, that are the same as or similar to the reinforcing fibers that can be used in the prepreg, the amount of the reinforcing fibers in the transformer film as or in the carrier material is less than the amount of reinforcing fibers in the prepreg(s). In certain embodiments, the transformer film comprises 50 wt. % or less, preferably 30 wt. % or less, more preferably 20 wt. % or less, and even more preferably 10 wt. % or less of the carrier material, based on the total wt. % of the transformer film. In additional preferred embodiments, the carrier material can have reinforcing fibers that form a structure such that the reinforcing fiber density is 20 gsm or less, preferably 15 gsm or less, and even more preferably 10 gsm or less. In other preferred embodiments, the carrier material is selected from reinforcing fibers useful in the prepreg, as discussed above, and preferably the reinforcing fibers used as the carrier material are glass fibers, carbon fibers, thermoplastic polymer fibers, glass fiber fabric, carbon fiber fabric, thermoplastic polymer fabric, glass veils, carbon fiber veils, thermoplastic polymer veils, and combinations thereof.

Moreover, in certain preferred embodiments, the transformer film comprises from 5 wt. % to 30 wt. %, preferably 10 wt. % to 30 wt. %, more preferably 10 wt. % to 20 wt. % of the carrier material, and from 70 wt. % to 95 wt. %, preferably 70 wt. % to 90 wt. %, and more preferably 80 wt. % to 90 wt. % of the matrix resin, based on the total wt. % of the transformer film. In other embodiments, the transformer film can consist of only the carrier material and the matrix resin. And in alternative embodiments, unlike the prepreg, the transformer film may not have any reinforcing fibers.

If the transformer film has a carrier material, the carrier material can be attached to the surface of the transformer film, for example, on one side of the transformer film, or the carrier material can be within the transformer film. Further, in certain embodiments, the transformer film can include a removable peel ply, release film, or both. In this respect, the removable peel ply, release film, or both, can be attached to the surface of the transformer film, which in certain embodiments may be attached to the surface of the carrier material of the transformer film and/or may be attached to the surface of the matrix resin of the transformer film. As used herein, the release film is a film that is removed from the transformer film prior to molding the composite layup to form the composite article. In contrast, as used herein, the removable peel ply is a peel ply that can be included in the molding process and can be removed from the composite article after the composite articled is molded (i.e., can be included in the molding process and removed post-molding). In other embodiments, the transformer film can have a thickness of 0.0005 inches to 0.1 inches, preferably from 0.001 to 0.01 inches.

The transformer film of the present invention can be used to increase the amount of the matrix resin present in the composite article resulting from the compression molding process. In this respect, the amount of the matrix resin in the compression mold cavity from the transformer film can be 0.1 wt. % to 10 wt. %, preferably 0.5 wt. % to 5 wt. %, based on the total wt. % of the matrix resin in the compression mold cavity. In other embodiments, the transformer film can have 2 wt. % to 20 wt. %, preferably 5 wt. % to 15 wt. % of the matrix resin, based on a total wt. of the matrix resin in the composite layup. In certain embodiments, the transformer film of the present invention can also be used to provide or increase the hydrostatic pressure in the mold cavity during the molding process, and in the same or other embodiments, the transformer film can also be used in the process to adjust or increase the thickness of the composite article, while providing the composite article with low porosity.

Composite Layup

The composite layup has at least one prepreg and at least one transformer film. Accordingly, the composite layup will have at least two plies, wherein at least one ply is at least one prepreg and at least one ply is at least one transformer film.

In preferred embodiments, the composite layup can be formed from combining at least one prepreg and at least one transformer film, in which the transformer film has the same matrix resin as the prepreg. In this respect, while the composite layup can have only one prepreg, the composite layup can also have multiple prepregs. As such, in certain embodiments, the composite layup can have 1 to 100 prepregs, preferably 5 to 50 prepregs, most preferably 8 to 15 prepregs.

Similarly, while the composite layup can have only one transformer film, the composite layup can also have multiple transformer films. In certain embodiments, the composite layup can have 1 to 10 transformer films, preferably 1 to 5 transformer films, and more preferably 1 or 2 transformer films. In preferred embodiments, the composite layup can have at least two transformer films. However, irrespective of how many prepregs are used in the composite layup, the composite layup has at least one transformer film in addition to the prepreg(s).

Further, in certain embodiments, the composite layup can be formed prior to placing the composite layup in the cavity of a compression mold. For instance, at least one prepreg and at least one transformer film can be combined to form the composite layup, and then the composite layup is placed in a compression mold cavity and the composite layup is molded to form the composite article. In yet another embodiment, at least one prepreg and at least one transformer film can be combined in a compression mold cavity so that the composite layup is formed in the compression mold cavity, and then the composite layup is molded to form the composite article. As such, the composite layup having at least one prepreg and at least one transformer film can be formed prior to placement in the compression mold cavity, or the composite layup having at least one prepreg and at least one transformer film can be formed by combing the at least one prepreg and the at least one transformer film in the compression mold cavity. As such, the latter embodiment allows for the composite layup to be formed in the compression mold cavity by layering or stacking the at least one prepreg and the at least one transformer film in the compression mold cavity, without the need for forming the composite layup before placement in the compression mold cavity.

Process for Compression Molding a Composite Article

The processes according to the instant invention can be used to make a variety of compression molded composite articles. In a particular embodiment, the process of the present invention makes a compression molded composite article, wherein the process comprises molding a composite layup in a compression mold cavity to form the composite article, wherein the composite layup comprises at least one prepreg and at least one transformer film, and the prepreg comprises a matrix resin and reinforcing fibers, and the transformer film comprises the matrix resin. The present invention also relates to a process for making a compression molded composite article, wherein the process comprises combining the prepreg and the transformer film to form a composite layup, placing the composite layup in a compression mold cavity, and molding the composite layup having the prepreg and the transformer film to form the composite article.

Composite articles can be made according to the present invention by placing or stacking multiple prepregs together to form a stack or prepreg layup. As used herein, "prepreg layup" means having at least two prepregs, but excludes having a transformer film. Accordingly, as used herein, prepreg layups can be distinguished from composite layups insomuch that the prepreg layup does not have a transformer film, whereas the composite layup has at least one transformer film.

The prepregs within the prepreg layup may be positioned or layered in a selected orientation with respect to one another, based on the orientation of the reinforcing fibers or other reinforcement structures within the prepregs and/or prepreg layup. For instance, the prepregs within the prepreg layup may be placed or stacked in the same general direction (e.g., at 0°) to one another, or the prepregs within the prepreg layup may be placed or stacked in various directions to one another (e.g., ±45°, 90°, etc.). The placement and direction of the prepregs within the prepreg layup can be oriented based on the desired strength and properties of the resulting composite article. As a non-limiting example, stacking or layering the prepregs within the prepreg layup in the same general direction may provide a composite article that is very strong in some directions (i.e., against the flexion of the reinforcements) while relatively weak in other directions (i.e., in the same direction as, and without flexion of, the reinforcements). Alternatively, stacking or layering the prepregs within the prepreg layup in various orientations, such as alternating the direction of the prepregs at ±45°, may provide a composite article that is generally strong in all directions.

In order to form the composite articles of the present invention, the composite layup, which has at least one prepreg and at least one transformer film, is molded in a compression mold cavity. Accordingly, in a particular embodiment, once the composite layup is formed, the composite layup is placed in a compression mold cavity, and the composite layup is heated under pressure to form the composite article. In yet another embodiment, at least one prepreg and at least one transformer film are placed in a compression mold cavity to form the composite layup, and the composite layup is heated under pressure to form the composite article.

As discussed above, the instant invention allows for forming the composite layup in the compression mold cavity. In this respect, the transformer film can be placed anywhere in the compression mold cavity. For example, the transformer film can be above the at least one prepreg, or below the at least one prepreg. Additionally, if more than one transformer film is used, then the transformer films can be placed in different sections of the compression mold cavity. In this respect, in certain embodiments, at least one transformer film is below the at least one prepreg in the compression mold cavity, and at least one transformer film is above the at least one prepreg in the compression mold cavity.

Furthermore, the transformer film can be placed anywhere on the prepreg(s), especially, but not limited to, if the composite layup is formed in the compression mold cavity. For example, a transformer film can be placed on only a portion of the prepreg(s), or the transformer film can be placed over the entire prepreg(s). Similarly, if the composite layup is formed prior to placement in the compression mold cavity, the transformer film can be located anywhere on the composite layup.

In certain embodiments, the compression molding process can include heated machine tooling surfaces. In this respect, if the compression molding process includes heated machine tooling surfaces, the tooling surfaces can be used to cross-link or thermoform the composite layup during the molding process. The heated machine tools can be attached to a press platen and can provide compression pressure during the compression molding process to wet the tool without excessively compacting the composite layup. Various types of compression molding process equipment can be used, including but not limited to servo-hydraulic presses and matched machine tools.

Various molding conditions can be used with the compression molding process to make the composite article. For example, the compression molding process can be controlled with respect to the molding time, mold position, pressure, and force applied by the molding process equipment. In certain embodiments, when the matrix resin has a thermoset resin, the temperature within compression mold cavity can range from 100° F.-500° F., preferably from 150°

F.-450° F., and more preferably from 250° F.-400° F. Alternatively, when the matrix resin has a thermoplastic resin, the temperature within compression mold cavity can range from 250° F.-750° F., preferably from 250° F.-475° F.

As for processing times, various processing times can be used depending on the shape and thickness of the composite article, as well as the matrix resin in the prepreg(s) and transformer film(s). In certain embodiments, the processing time, which as used herein means the time that the composite article is in the mold, can range from 1 minute to 1 hour, and preferably ranges from 2 minutes to 30 minutes. Additionally, depending on the type of composite article made, as well as the factors identified above with respect to the process time, the force applied by the molding process equipment can range from 200 kN to 2000 kN, preferably from 300 kN to 1800 kN, and more preferably from 450 kN to 1200 kN. In some embodiments, the force applied to the composite layup in the mold can be from 100 kN/m$^2$ to 3400 kN/m$^2$.

Moreover, in certain embodiments, the composite layup can be preheated prior to being placed in the compression mold cavity.

Composite Article

A variety of composite articles can be made from the process of the instant invention. For example, composite articles for aerospace, automotive, and industrial applications can be made from the process. In this respect, it is customary for composite articles in such applications to have certain requirements with respect to the final fiber volume % in the composite article. For instance, depending on the application, the composite article may be required to have a final fiber volume % within a set range. If the final fiber volume % is outside of this range, then the composite article may be considered outside of the required specification standards.

In general, the process can make a composite article that has a final fiber volume % that is within 3%, preferably within 2%, and most preferably within 1% of the desired fiber volume % of the composite article, wherein the desired fiber volume % of the composite article is a set fiber volume % value before the composite article is made by the process of the instant invention. In other embodiments, the process can make a composite article that has a final matrix resin content that is within 10 wt. %, preferably within 8 wt. %, more preferably within 6 wt. %, and even more preferably within 3 wt. % of the desired final matrix resin content in the composite article, wherein the desired final matrix resin content in the composite article is a set matrix resin content value before the composite article is made by the process of the instant invention. In further preferred embodiments, the process can make a composite article that has a final fiber volume % of less than 62%, preferably less than 60%, more preferably less than 58.5%, based on the total volume of the composite article. The process can also make a composite article having a final fiber volume % that is at least 40%, preferably at least 50%, and more preferably at least 52%, based on the total volume of the composite article. And in additional preferred embodiments, the process can make a composite article that has a final matrix resin content of at least 34 wt. %, preferably at least 35 wt. %, based on the total wt. % of the composite article. The process can also make a composite article having a final matrix resin content of less than 50 wt. %, preferably less than 40 wt. %, and more preferably less than 38.5 wt. %, based on the total wt. % of the composite article.

The final fiber volume % and final matrix resin content can be determined according to ASTM D792 and ASTM D3171, based on specimens cut from the composite article. Once the final fiber volume % and final matrix resin content of the composite article is determined, these values can then be compared to the set fiber volume % value and the set matrix resin content value to determine if the composite article has a final fiber volume % and final matrix resin content within the desired ranges.

In addition to making composite articles that can have a final fiber volume % and can have a final matrix resin content within a given percentage of the desired values, the process can add additional matrix resin to the composite articles by using the transformer film. In certain embodiments, the transformer film comprises 2 wt. % to 20 wt. %, preferably 5 wt. % to 15 wt. % of the matrix resin, based on a total wt. % of the matrix resin in the composite layup. In other embodiments, the amount of the matrix resin in the compression mold cavity from the transformer film can be 0.1 wt. % to 10 wt. %, preferably 0.5 wt. % to 5 wt. %, based on the total wt. % of the matrix resin in the compression mold cavity.

Additionally, in certain embodiments, the process can make composite articles having a porosity of less than 2%, preferably 1% or less, and more preferably 0.5% or less, based on the test method described below. And in other embodiments, the process can make composite articles having a surface thickness of the matrix resin from the transformer film of 0.0005 inches to 0.1 inches. The surface thickness of the matrix resin from the transformer film is the thickness of the matrix resin on the surface of the composite article after the composite article is molded, which can be determined based on the test method described below (i.e., the IML and OML surface matrix resin thickness test method).

EXAMPLES

The following examples are illustrative of preferred embodiments of processes for making compression molded composite articles, and are not intended to be limitations thereon. All composition percentages are based on totals equal to 100% by weight, unless otherwise specified.

Materials

A trifunctional epoxy resin available from Huntsman Corporation ("Epoxy 1")

A trifunctional epoxy resin available from Huntsman Corporation ("Epoxy 2")

A polyethersulfone/polyetherethersulfone copolymer available from Cytec Industries ("PES/PEES copolymer")

3,3'-diaminodiphenyl sulfone available from Showa America Inc. ("3,3'-DDS")

Isophthalic dihydrazide available from A&C Catalyst Inc. ("IDH")

Coated silicone release paper, 60 lb. basis weight, available from Mondi Group ("coated silicone release paper")

Optimat® E Glass Veil, a glass veil having 10 grams per square meter (gsm) available from Plastic Reinforcement Fabrics Ltd. ("glass veil")

A woven fabric made of 3k T650 reinforcing fiber having 370 gsm ("fiber reinforcement")

General Process

Transformer Film

To form the matrix resin for the transformer film, Epoxy 1 and Epoxy 2 were added to a mixing vessel and heated to 260° F., and then the PES/PEES copolymer was added to the mixing vessel. The mixture of Epoxy 1, Epoxy 2, and the PES/PEES copolymer was cooled to 190° F., and then the IDH was added to the mixing vessel. The mixture of Epoxy 1, Epoxy 2, PES/PEES copolymer, and IDH was then cooled to 170° F., and then the 3,3'-DDS was added to the mixing vessel. Once fully mixed, the matrix resin was then layered onto the coated silicone release paper using a roll coater from Independent Machine Company to produce a wet film having a thickness of 0.003 inches. The wet film is then laminated with the glass veil to form the transformer film.

Prepreg

The same matrix resin used for the transformer film is prepared, and the fiber reinforcement is impregnated with the matrix resin to make the prepreg.

Test Methods

Porosity was determined by cutting specimens from the composite article, and polishing the cross-section of the specimens. The specimens are then analyzed using a ZEISS optical microscope and AxioVision software detects and quantifies the amount of voids to determine the porosity.

Matrix resin content and fiber volume fraction (i.e.., fiber volume %) were determined according to ASTM D792 and ASTM D3171 based on specimens cut from the composite article.

IML and OML surface matrix resin thickness was determined by cutting specimens from the composite article, and polishing the cross-section of the specimens. The specimens are then analyzed using a ZEISS optical microscope to measure the thickness between the fiber bed and surface of the part on both sides of the specimen (OML and IML sides).

Example 1

Fourteen (14) prepregs consisting of nine (9) full prepregs and five (5) partial prepregs and two (2) transformer films were combined to form a composite layup. The partial prepregs were used as local pad-ups for the composite layup. The composite layup was molded by compression molding at 350° F., with a press force of 1200 kN for thirty (30) min. to form a composite article. Specimens were then cut from the composite article. Specimen 1-1 was cut from a flange of the composite article, and Specimen 1-2 was cut from the top surface of the composite article.

Comparative Example 2

The same number of prepregs used in Example 1 were combined to form a prepreg layup, which was molded by compression molding at the same temperature and time as Example 1, with a press force of 460 kN, to form a comparative composite article. Specimens were then cut from the comparative composite article. Specimen 2-1 was cut from a flange of the comparative composite article, and Specimen 2-2 was cut from the top surface of the comparative composite article.

The results are shown in Table 1 below:

TABLE 1

| | Spec. | Trans. | Porosity [%] | | | Fiber Volume Fraction [%] | | | Matrix Resin Content [%] | | |
| --- | --- | --- | --- | --- | --- | --- | --- | --- | --- | --- | --- |
| | | | Av. | Min. | Max. | Av. | Min. | Max. | Av. | Min. | Max. |
| CE 2 | 2-1 | No  | 0.5 | 0.0 | 2.0 | 58.0 | 56.4 | 59.2 | 34.0 | 33.1 | 35.3 |
| CE 2 | 2-2 | No  | 0.1 | 0.0 | 0.3 | 56.2 | 55.6 | 56.5 | 36.1 | 35.8 | 36.5 |
| Ex 1 | 1-1 | Yes | 0.3 | 0.1 | 0.7 | 55.3 | 54.0 | 56.8 | 36.9 | 35.4 | 38.0 |
| Ex 1 | 1-2 | Yes | 0.0 | 0.0 | 0.0 | 56.9 | 55.6 | 58.3 | 35.7 | 34.3 | 36.8 |

*Spec. stands for Specimen
**Trans. stands for Transformer Film

As demonstrated above in Table 1, when a transformer film is used, the average porosity can be decreased, and the overall maximum porosity can be significantly decreased. Similarly, the average fiber volume fraction (Le., fiber volume %) can be decreased, and the overall maximum fiber volume fraction can be significantly decreased. Also, and at the same time, the matrix resin content can be increased.

Example 3

The same number of prepregs and transformer films in Example 1 were combined to form a composite layup, which was molded by compression molding at the same temperature, press force, and time as Example 1 to form a composite article. Specimens were then cut from the composite article. Specimen 3-1 was cut from a flange of the composite article, and Specimen 3-2 was cut from the top surface of the composite article.

Comparative Example 4

The same number of prepregs in Example 1 were combined to form a prepreg layup, which was molded by compression molding at the same temperature and time as Example 1, with a press force of 800 kN, to form a comparative composite article. Specimens were then cut from the comparative composite article. Specimen 4-1 was cut from a flange of the comparative composite article, and Specimen 4-2 was cut from the top surface of the comparative composite article.

The results are shown in Table 2 below:

TABLE 2

| | Trans. | Spec. | IML Surface Matrix Resin Thickness [inches] | OML Surface Matrix Resin Thickness [inches] |
| --- | --- | --- | --- | --- |
| CE 2 | No | 2-1 | 0.0000 | 0.0017 |
| CE 2 | No | 2-2 | 0.0000 | 0.0000 |

TABLE 2-continued

| | Trans. | Spec. | IML Surface Matrix Resin Thickness [inches] | OML Surface Matrix Resin Thickness [inches] |
|---|---|---|---|---|
| CE4 | No | 4-1 | 0.0000 | 0.0000 |
| CE4 | No | 4-2 | 0.0000 | 0.0000 |
| Ex 1 | Yes | 1-1 | 0.0017 | 0.0039 |
| Ex 1 | Yes | 1-2 | 0.0013 | 0.0025 |
| Ex 3 | Yes | 3-1 | 0.0021 | 0.0032 |
| Ex 3 | Yes | 3-2 | 0.0019 | 0.0022 |

\* Spec. stands for Specimen
\*\* Trans. stands for Transformer Film
\*\*\* IML stands for inner mold line
\*\*\*\* OML stands for outer mold line As demonstrated above in Table 2, when a transformer film is used, the thickness of the matrix resin at the surface of the composite article can be increased. More specifically, as shown in Table 2, the transformer film provided a layer of surface matrix resin at the inner mold line (IML) and outer mold line (OML) of the composite article, whereas without the transformer film, nearly none of the specimens showed any matrix resin at the surface of the composite article.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

The invention claimed is:

1. A process for compression molding a composite article, the process comprising:
combining at least one prepreg and at least one transformer film to form a composite layup, wherein the prepreg comprises a matrix resin and reinforcing fibers, and the transformer film comprises the same matrix resin;
placing the composite layup in a compression mold cavity defined by at least two mold parts, wherein the mold cavity is formed between the mold parts; and
molding the composite layup to form the composite article,
wherein the at least one transformer film comprises 30 wt. % or less of a carrier material composed of reinforcing fibers, and at least 70 wt. % of the matrix resin, based on the total wt. % of the transformer film,
wherein the at least one prepreg comprises 25 wt. % to 50 wt. % of the matrix resin, and 50 wt. % to 75 wt. % of the reinforcing fibers, based on the total wt. % of the prepreg, and
wherein 0.1 wt. % to 10 wt. % of the matrix resin in the compression mold cavity is from the transformer film, based on the total wt. % of the matrix resin in the compression mold cavity.

2. The process according to claim 1, wherein the matrix resin is a thermoplastic polymer selected from polyamides, polyphthalamides, poly (aryl ether sulfone) s, and combinations thereof.

3. The process according to claim 1, wherein the matrix resin is a thermoset polymer selected from epoxies, phenolics, phenols, cyanate esters, bismaleimides, benzoxazines, polybenzoxazines, polybenzoxazones, and combinations thereof and precursors thereof.

4. The process according to claim 1, wherein the reinforcing fibers in the at least one prepreg are selected from glass fibers, carbon fibers, glass fiber fabric, carbon fiber fabric, and combinations thereof.

5. The process according to claim 1, wherein said composite layup is formed by combining multiple prepregs with two transformer films such that one transformer film is above the prepregs and one transformer film is below the prepregs in the compression mold cavity.

6. The process according to claim 1, wherein the transformer film has a thickness of 0.0005 inches to 0.1 inches.

7. The process according to claim 1, wherein the molded composite article has a porosity of less than 2%.

8. A process for compression molding a composite article, the process comprising molding a composite layup in a compression mold cavity to form the composite article, wherein the composite layup comprises multiple prepregs and at least one transformer film, each prepreg comprises a matrix resin and reinforcing fibers, and the at least one transformer film is formed of the same matrix resin, and wherein the amount of matrix resin in the transformer film is higher than the amount of matrix resin in each prepreg, and wherein 0.1-10 wt. % of the matrix resin in the compression mold cavity is from the transformer film, based on the total wt. % of the matrix resin in the compression mold cavity.

\* \* \* \* \*